United States Patent
Seo et al.

(10) Patent No.: US 8,964,669 B2
(45) Date of Patent: Feb. 24, 2015

(54) METHOD AND APPARATUS FOR RECEIVING DOWNLINK DATA IN MULTI-CARRIER SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/498,000

(22) PCT Filed: Sep. 20, 2010

(86) PCT No.: PCT/KR2010/006472
§ 371 (c)(1),
(2), (4) Date: Mar. 23, 2012

(87) PCT Pub. No.: WO2011/037392
PCT Pub. Date: Mar. 31, 2011

(65) Prior Publication Data
US 2012/0177000 A1    Jul. 12, 2012

Related U.S. Application Data

(60) Provisional application No. 61/245,289, filed on Sep. 24, 2009.

(51) Int. Cl.
*H04W 4/00* (2009.01)
*H04L 27/26* (2006.01)
*H04L 5/00* (2006.01)

(52) U.S. Cl.
CPC ............ *H04L 27/2647* (2013.01); *H04L 5/001* (2013.01); *H04L 5/0053* (2013.01); *H04L 5/0094* (2013.01); *H04L 5/0007* (2013.01)

USPC .......................................................... 370/329

(58) Field of Classification Search
CPC .................. H04W 72/04; H04L 27/28
USPC .......................................................... 370/329
See application file for complete search history.

(56) References Cited

U.S. PATENT DOCUMENTS

| 8,233,458 B2 * | 7/2012 | Ahn et al. ................ 370/335 |
| 2009/0219875 A1 * | 9/2009 | Kwak et al. ............... 370/329 |

(Continued)

OTHER PUBLICATIONS

Panasonic, "Component Carrier Operation Without PDCCH," 3GPP TSG-RAN WG1 Meeting #58, Agenda Item 15.4, R1-093598(R1-093466), Shenzhen, China, Aug. 24-28, 2009, 4 pages.

(Continued)

*Primary Examiner* — Dang Ton
*Assistant Examiner* — Nourali Mansoury
(74) *Attorney, Agent, or Firm* — Birch, Stewart, Kolasch & Birch, LLP

(57) ABSTRACT

A method and an apparatus for receiving downlink data in a multi-carrier system are provided. A terminal receives a downlink grant on a physical downlink control channel (PDCCH) via a first component carrier, and determines a transmission power of a physical downlink shared channel (PDSCH) depending on whether a control channel exists in each orthogonal frequency division multiplexing (OFDM) symbol of a subframe of a second component carrier that is indicated by the downlink grant. Based on the transmission power of the PDSCH, the terminal receives downlink data on the PDSCH indicated by the downlink grant via the second component carrier. When a control channel and a data channel coexist in the same OFDM symbol, the reliability of receiving the control channel can be increased.

12 Claims, 8 Drawing Sheets

(56) References Cited

U.S. PATENT DOCUMENTS

2011/0034175 A1* 2/2011 Fong et al. .................... 455/450
2011/0044275 A1* 2/2011 Ishii .............................. 370/329

OTHER PUBLICATIONS

3GPP TS 36.211 V8.7.0, "Technical Specification Group Radio Access Network; Evolved Universal Terrestrial Radio Access (E-UTRA); Physical Channels and Modulation (Release 8)", May 2009.

D. Laselva, et al., "On the Impact of Realistic Control Channel Constraints on QoS Provisioning in UTRAN LTE," 2009 IEEE 70th Vehicular Technology Conference Fall, pp. 1-5, Sep. 23, 2009.

S.-J. Lee, et al., "Forward Error Correction Decoding for WiMAX and 3GPP LTE Modems," 2008 42nd Asilomar Conference on Signals, Systems and Computers, pp. 1143-1147, Oct. 29, 2008.

* cited by examiner

METHOD AND APPARATUS FOR RECEIVING DOWNLINK DATA IN MULTI-CARRIER SYSTEM

CROSS REFERENCE TO RELATED APPLICATIONS

This application is the National Phase of PCT/KR2010/006472 filed on Sep. 20, 2010, which claims priority under 35 U.S.C. 119(e) to U.S. Provisional Application No. 61/245,289 filed on Sep. 24, 2009, all of which are hereby expressly incorporated by reference into the present application.

TECHNICAL FIELD

The present invention relates to wireless communications, and more particularly, to an apparatus and method for supporting multiple carriers in a wireless communication system.

BACKGROUND ART

A system using multiple carriers has been developed to support a higher data rate.

For example, $3^{rd}$ generation partnership project (3GPP) long term evolution (LTE) is a system based on 3GPP technical specification (TS) release 8. The 3GPP LTE system supports only one bandwidth (i.e., one carrier) among {1.4, 3, 5, 10, 15, 20} MHz. In order to support a full bandwidth of 40 MHz, the multiple carrier system uses two carriers having a bandwidth of 20 MHz or uses 3 carriers respectively having bandwidths of 20 MHz, 15 MHz, and 5 MHz.

The multiple carrier system can support backward compatibility with respect to legacy systems, and can significantly increase a data rate by using multiple carriers.

Downlink power control is an operation in which a BS determines transmit power of a downlink channel and reports the determined transmit power to a UE. This is because a high-order modulation scheme (e.g., 16 quadrature amplitude modulation (QAM), 64 QAM, etc.) has a different transmit power level for each constellation point of a modulation symbol, and thus error-free decoding is possible only when the UE knows the transmit power level.

With the introduction of multiple carriers, a channel structure may vary. Accordingly, downlink power control also needs to consider the multiple carriers.

SUMMARY OF INVENTION

Technical Problem

The present invention provides a downlink data receiving method and apparatus for increasing reception reliability of a control channel.

The present invention also provides a downlink power control method and apparatus for increasing reception reliability of a control channel.

Technical Solution

In an aspect, a method of receiving downlink data in a multi-carrier system is provided. The method includes receiving a downlink grant on a physical downlink control channel (PDCCH) via a first component carrier, determining a transmit power of a physical downlink shared channel (PDSCH) according to the presence or absence of a control channel in each orthogonal frequency division multiplexing (OFDM) symbol of a subframe of a second component carrier indicated by the downlink grant, and receiving downlink data on the PDSCH indicated by the downlink grant via the second component carrier on the basis of the transmit power of the PDSCH.

The control channel may include a physical control format indicator channel (PCFICH) and a physical hybrid-ARQ indicator channel (PHICH).

The PDCCH may not be transmitted in the second component carrier.

The method may further include receiving from a base station a power parameter used to determine the transmit power of the PDSCH.

The step of determining the transmit power of the PDSCH may include determining the transmit power of the PDSCH according to the presence or absence of the control channel and a reference signal in each OFDM symbol.

In another aspect, a user equipment for receiving downlink data in a multi-carrier system is provided. The user equipment includes a radio frequency (RF) unit for transmitting and receiving a radio signal, and a processor coupled to the RF unit and configured to receive a downlink grant on a physical downlink control channel (PDCCH) via a first component carrier, determine a transmit power of a physical downlink shared channel (PDSCH) according to the presence or absence of a control channel in each orthogonal frequency division multiplexing (OFDM) symbol of a subframe of a second component carrier indicated by the downlink grant, and receive downlink data on the PDSCH indicated by the downlink grant via the second component carrier on the basis of the transmit power of the PDSCH.

Advantageous Effects

Reception reliability of a control channel can be increased when the control channel and a data channel coexist in the same orthogonal frequency division multiplexing (OFDM) symbol.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a digital assistant, a wireless modem, a handheld device, etc.

A BS is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Figure 1:
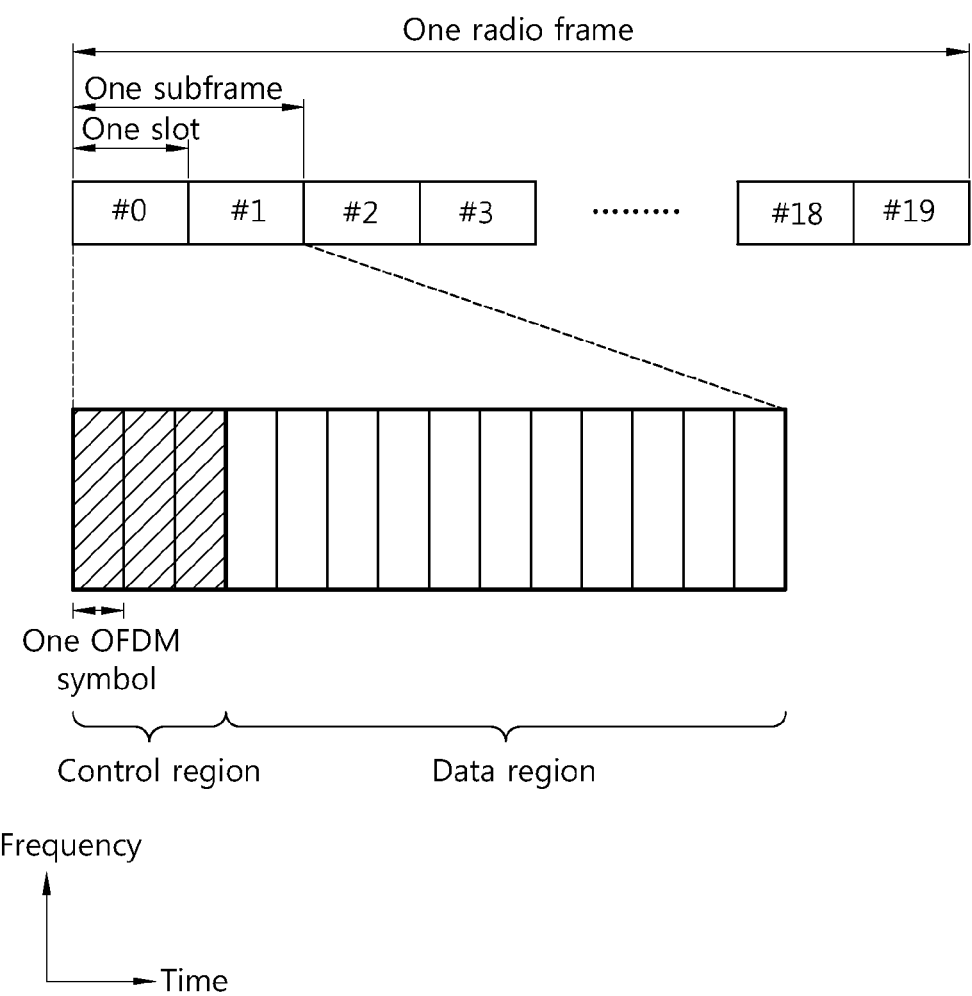
FIG. 1 shows a downlink radio frame structure in $3^{rd}$ generation partnership project (3GPP) long term evolution (LTE).

FIG. 1 shows a downlink (DL) radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" can be incorporated herein by reference.

A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A downlink (DL) subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region and other control channels, and a physical downlink shared channel (PDSCH) is allocated to the data region.

As disclosed in 3GPP TS 36.211 V8.7.0, the 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PHICH carries a positive acknowledgement (ACK)/negative-acknowledgement (NACK) signal for uplink hybrid automatic repeat request (HARQ). The ACK/NACK signal for uplink (UL) data on the PUSCH transmitted by the UE is transmitted on the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having its DCI.

In order to receive DL data, the UE first receives a DL grant on the PDCCH. DL data on the PDSCH is received by using the DL grant. In addition, to transmit UL data, the UE first receives a UL grant on the PDCCH. UL data is transmitted on the PUSCH by using the UL grant.

Figure 2:
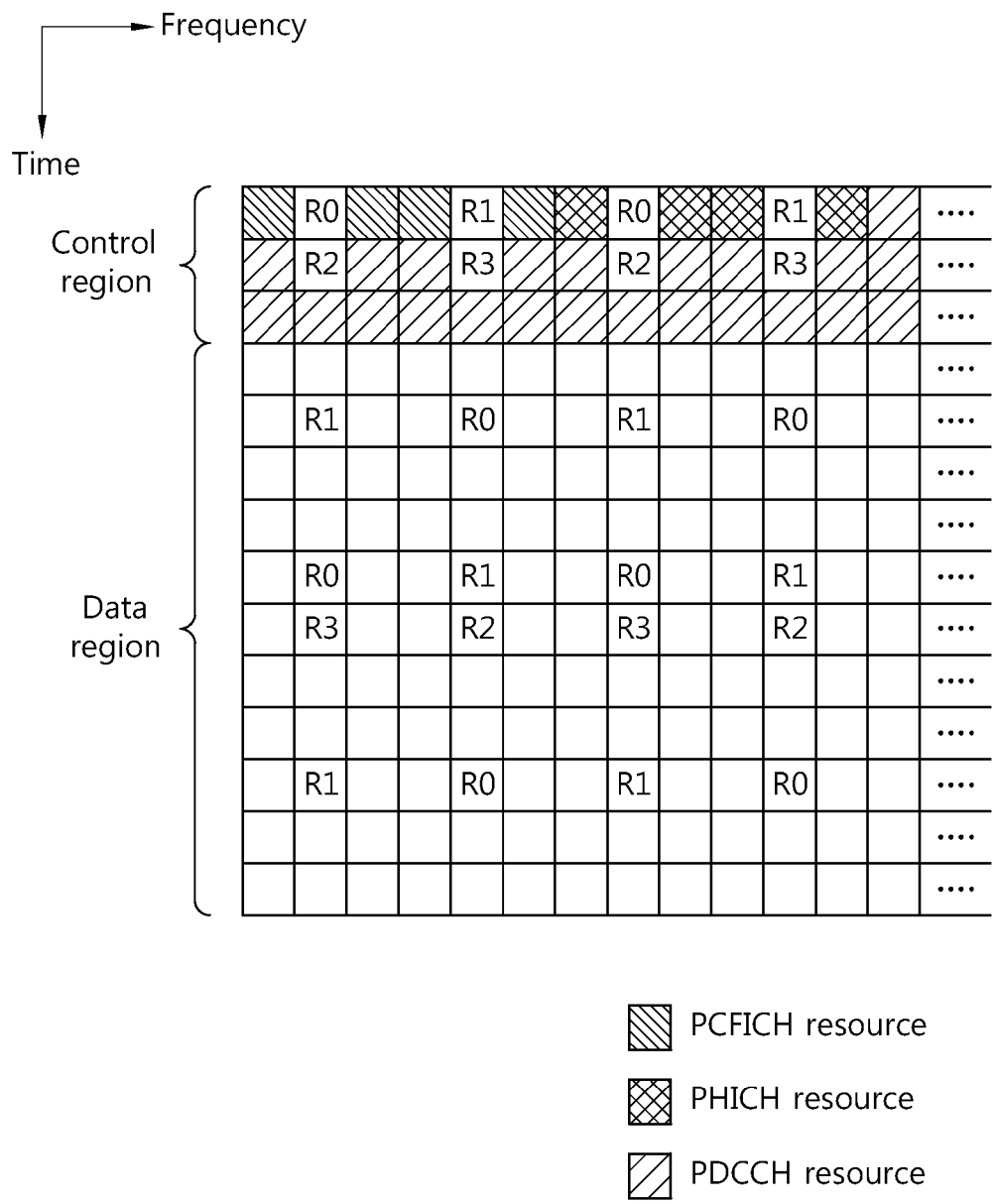
FIG. 2 shows an example of resource mapping in a subframe.

FIG. 2 shows an example of resource mapping in a subframe. The section 6.8 of 3GPP TS 36.211 V8.7.0 can be incorporated herein by reference.

A control region includes 3 OFDM symbols, and one box corresponds to one RE. R0 denotes a reference signal of a $1^{st}$ antenna port. R1 denotes a reference signal of a $2^{nd}$ antenna port. R2 denotes a reference signal of a $3^{rd}$ antenna port. R3 denotes a reference signal of a $4^{th}$ antenna port.

A PCFICH resource indicates REs used for PCFICH transmission. A PHICH resource indicates REs used for PHICH transmission. A PDCCH resource indicates REs used for PDCCH transmission. Therefore, in a $1^{st}$ OFDM symbol, not only the PDCCH but also a reference signal of a $1^{st}$ antenna port or a $2^{nd}$ antenna port, the PCFICH, and the PHICH are transmitted.

In a data region in which the PDSCH is transmitted, a resource for a control channel is not allocated, and only a reference signal is allocated.

The number of OFDM symbols in a subframe, the position and the number of reference signals in the subframe, the position and the number of PHICH resources, the position and the number of PCFICH resources, and the position and the number of PDCCH resources are for exemplary purposes only.

Now, downlink power allocation will be described with reference to the section 5.2 of 3GPP TS 36.213 V8.7.0 (2009-05).

A transmit power level for PDSCH transmission differs depending on the presence/absence of a reference signal in each OFDM symbol. This is because the PDSCH is transmitted with a lower power level due to power boosting for the reference signal in an OFDM symbol in which the reference signal and the PDSCH are transmitted together.

When using a modulation scheme (e.g., 16 quadrature amplitude modulation (QAM), 64 QAM, etc.) having a different transmit power level for each constellation point of a modulation symbol, a BS needs to repot the transmit power level to a UE.

Downlink power control determines energy per resource element (EPRE).

The UE obtains reference signal (RS) EPRE from an RS power parameter provided by a higher layer. Until another RS power parameter is received, the UE assumes that the RS EPRE is constant across a system bandwidth and a subframe.

As shown in Table 1 below, $\rho_A$ or $\rho_B$ which is a ratio of PDSCH EPRE to RS EPRE is determined according to an OFDM symbol index in a slot.

TABLE 1

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal CP | Extended CP | Normal CP | Extended CP |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

In 16 QAM and 64 QAM, if the UE receives PDSCH transmission using precoding for transmit diversity having four antenna ports, then $\rho_A = \delta_{power\text{-}offset} + P_A + 10\log_{10}(2)$. Otherwise, $\rho_A = \delta_{power\text{-}offset} + P_A$. $\delta_{power\text{-}offset}$ is 0 dB for all PDSCH transmission schemes other than multi-user (MU) multiple input multiple output (MIMO). $P_A$ is a UE-specific parameter provided by a higher layer.

A cell-specific ratio $\rho_B/\rho_A$ is given by Table 2 below. A cell-specific parameter $P_B$ is provided by a higher layer.

TABLE 2

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

$\rho_A$ may be a power ratio in an OFDM symbol in which only a PDSCH exists. By receiving a parameter $P_A$ from the BS, the UE determines transmit power of the PDSCH.

$\rho_B$ may be a power ratio in an OFDM symbol in which a PDSCH and an RS coexist. By receiving a parameter $P_B$ from the BS, the UE determines transmit power of the PDSCH.

Now, a multiple carrier system will be described.

The multiple carrier system uses a plurality of component carriers (CCs). One CC is defined with a center frequency and a bandwidth.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems. For example, if 5 CCs are assigned as a granularity of a carrier unit having a bandwidth of 20 MHz, a bandwidth of up to 100 MHz can be supported.

Figure 3:
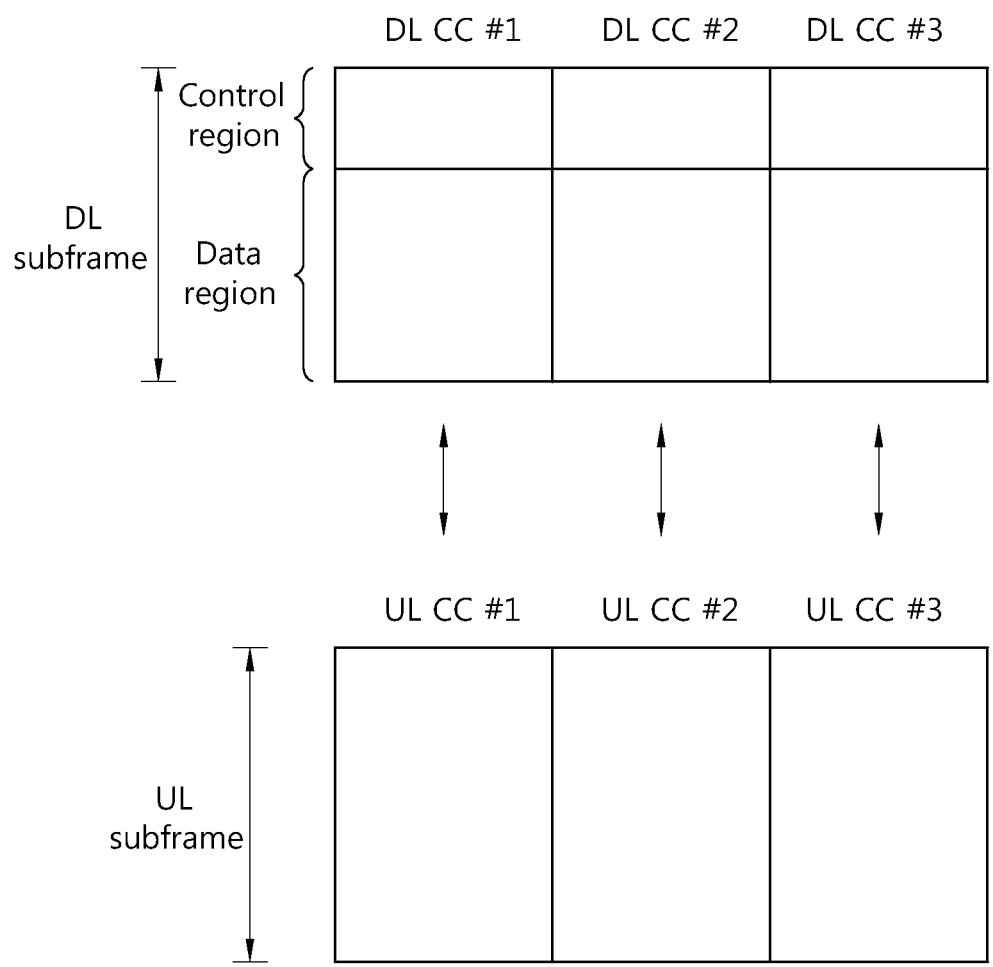
FIG. 3 shows an example of multiple carriers.

FIG. 3 shows an example of multiple carriers. Although 3 DL CCs and 3 UL CCs are shown herein, the number of DL CCs and the number of UL CCs are not limited thereto. In each DL CC, a PDCCH and a PDSCH are independently transmitted. In each UL CC, a PUCCH and a PUSCH are independently transmitted.

Figure 4:
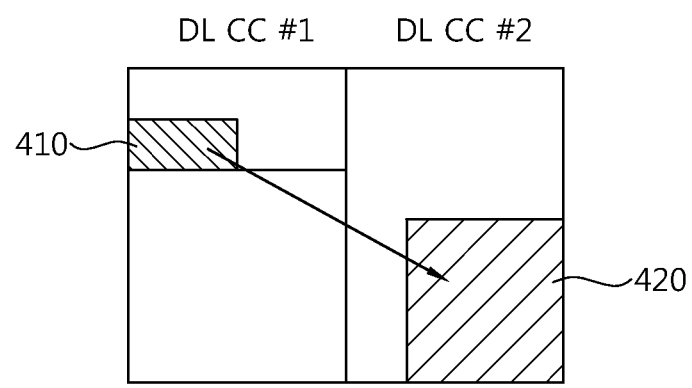
FIG. 4 shows an example of cross-carrier scheduling.

FIG. 4 shows an example of cross-carrier scheduling. Cross-carrier scheduling may be possible among the plurality of CCs.

A PDSCH 420 of a DL CC #2 may be indicated by using a DL grant of a PDCCH 410 of a DL CC #1. For cross-carrier scheduling, in addition to resource allocation of the PDSCH 420, the DL grant of the PDCCH 410 may include information on a carrier index indicating the DL CC #2 in which the PDSCH is scheduled.

According to the existing 3GPP LTE specification, a PCFICH resource is allocated to a $1^{st}$ OFDM symbol of a subframe. Further, a PHICH resource is allocated in a control region. In a data region, only a PDSCH and an RS are allocated. Therefore, as described above, a power level for PDSCH transmission varies depending on the presence/absence of an RS in each OFDM symbol.

However, with the introduction of cross-carrier scheduling in a multi-carrier system, there may be a CC in which a PDCCH is unnecessary. For example, if resource allocation for all PDSCHs of the DL CC #2 is achieved by using the DL CC #1, a PDCCH may be unnecessary in the DL CC #2. A CC in which the PDCCH is not transmitted is called a PDCCH-less CC.

Figure 5:
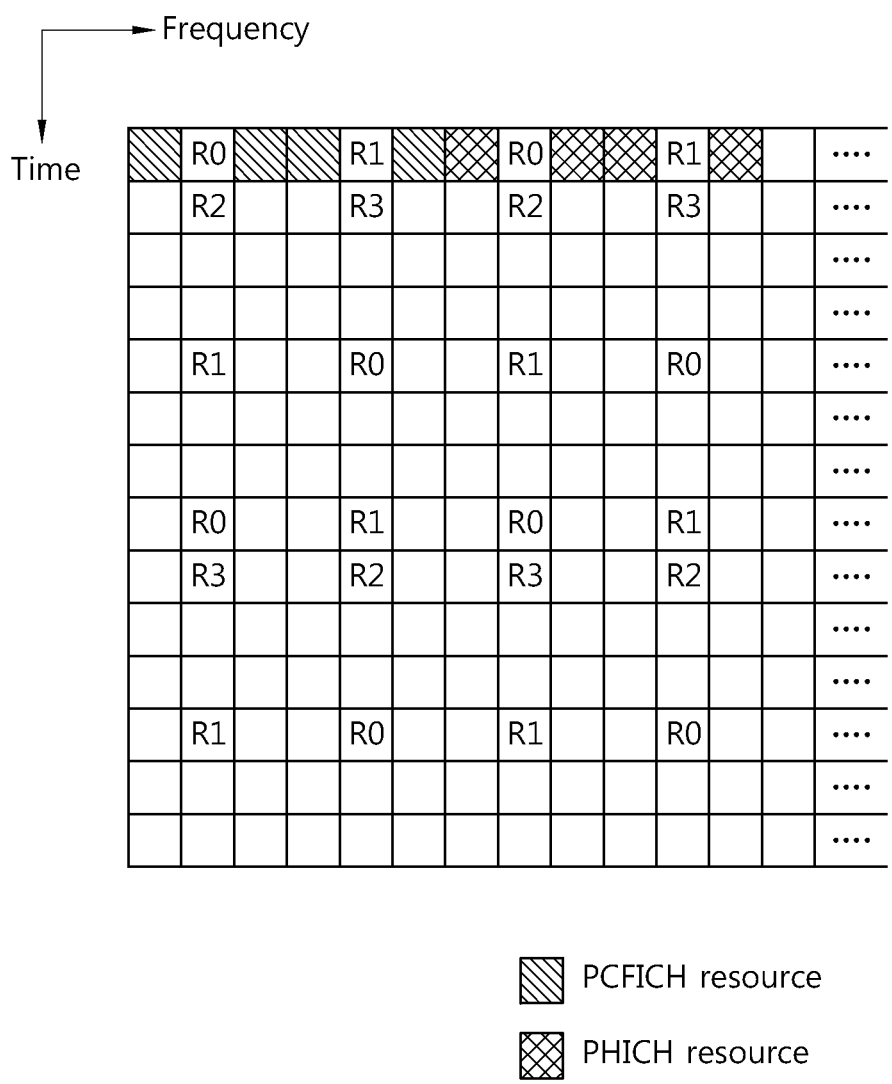
FIG. 5 shows an example of a subframe of a physical downlink control channel (PDCCH)-less component carrier (CC).

FIG. 5 shows an example of a subframe of a PDCCH-less CC.

A PCFICH resource and a PHICH resource can be allocated to a $1^{st}$ OFDM symbol, and a PDSCH resource can be allocated to the remaining REs.

In the existing 3GPP LTE, only power boosting for an RS is considered. Therefore, in power control, it is enough to consider whether the RS is transmitted in PDSCH transmission.

However, if a control channel such as a PCFICH and a PHICH has a reception error, it may have a significant effect on an operation of the UE, and thus power boosting of the control channel needs to be taken into account to increase reception reliability of the control channel.

Figure 6:
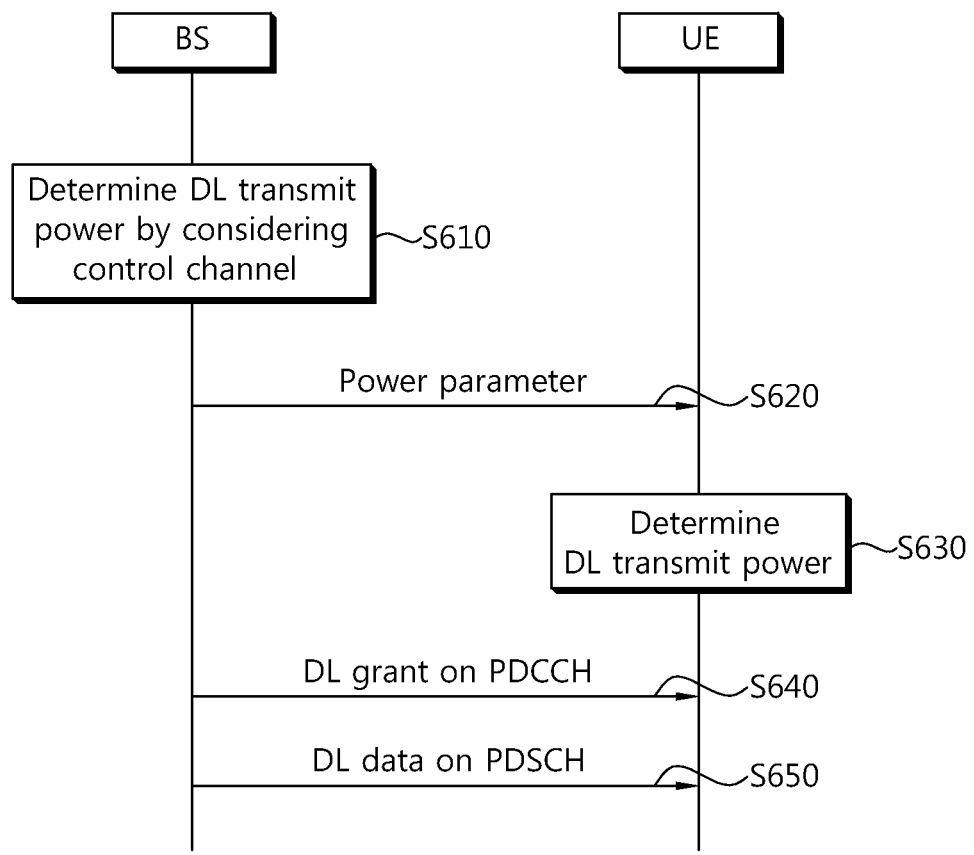
FIG. 6 is a flowchart showing a power control method according to an embodiment of the present invention.

FIG. 6 is a flowchart showing a power control method according to an embodiment of the present invention.

A BS determines DL transmit power in each OFDM symbol of a subframe of each CC by considering a control channel (step S610). The BS determines the DL transmit power according to the presence/absence of not only an RS but also a control channel in each OFDM symbol of the subframe of each CC.

Transmit power of each OFDM symbol is constant in a subframe. A CC in which the presence/absence of the control channel is considered in the determining of the DL transmit power may be a PDCCH-less CC. The control channel may include a PCFICH and a PHICH. The control channel may be allocated to any one of $1^{st}$, $2^{nd}$, and $3^{rd}$ OFDM symbols of the subframe.

The BS sends to the UE a power parameter used by the UE to determine DL transmit power (step S620). The UE determines DL transmit power for a PDSCH on the basis of the power parameter (step S630). The UE can determine transmit power of the PDSCH and/or transmit power of the control channel on the basis of the power parameter. The determining of the parameter and the DL transmit power will be described below.

The UE receives a DL grant on a PDCCH of a $1^{st}$ CC (step S640). The DL grant can include a resource allocation indicating a PDSCH of a $2^{nd}$ CC and a carrier index indicating the $2^{nd}$ CC. The $2^{nd}$ CC may be a PDCCH-less CC.

The UE receives DL data on a PDSCH of a $2^{nd}$ CC on the basis of the determined transmit power of the PDSCH (step S650). The DL data can be modulated by using a modulation scheme (e.g., 16QAM, 64QAM, etc.) in which a transmit power level is different for each constellation point of a modulation symbol.

Since control channels are power-boosted, the UE can receive the control channels in a more reliable manner.

As described above, in 3GPP LTE, transmit power in each OFDM symbol is determined according to the presence/absence of an RS in PDSCH transmission. In this case, the transmit power is determined based on power ratios $\rho_A$ and $\rho_B$ and power parameters $P_A$ and $P_B$.

When considering power boosting of the control channel (i.e., PHICH and PCFICH), transmit power that can be allocated to the PDSCH can vary according to the presence/absence of the control channel exists. In the proposed invention, a power ratio and a power parameter for channel combination of a PCFICH and a PHICH are additionally defined to determine transmit power of the PCFICH and the PHICH, and the UE can determine DL transmit power on the basis of the additionally defined power ratio and power parameter.

When utilizing existing parameters, the parameters can be combined in each OFDM symbol of a subframe as shown in Table 3 below.

TABLE 3

| Combination | Presence/absence of RS | Presence/absence of control channel | Power ratio | Power parameter |
|---|---|---|---|---|
| A | absent | absent | $\rho_A$ | $P_A$ |
| B | present | absent | $\rho_B$ | $P_B$ |
| C | absent | PHICH | $\rho_C$ | $P_C$ |
| D | present | PHICH | $\rho_D$ | $P_D$ |
| E | present | PCFICH, PHICH | $\rho_E$ | $P_E$ |
| F | present | PCFICH | $\rho_F$ | $P_F$ |

In the existing 3GPP LTE, only combinations A and B can be used. To determine transmit power according to the presence/absence of the PHICH and/or the PCFICH, new power ratios $\rho_C$, $\rho_D$, $\rho_E$, and $\rho_F$ are defined, and new power parameters $P_C$, $P_D$, $P_E$, and $P_F$ signaled by the BS to the UE are defined.

The followings are examples of signaling based on combinations.

(1) When PCFICH and PHICH exist in OFDM symbol

Since combinations A, B, C, D, and E are possible, $\rho_A$, $\rho_B$, $\rho_C$, $\rho_D$, and $\rho_E$ are determined, and the BS signals power parameters $P_A$, $P_B$, $P_C$, $P_D$, and $P_E$ to the UE.

(2) When only PCFICH exists in OFDM symbol

Since combinations A, B, and F are possible, $\rho_A$, $\rho_B$, and $\rho_F$ are determined, and the BS signals power parameters $P_A$, $P_B$, and $P_F$ to the UE.

(3) When only PHICH exists in OFDM symbol

Since combinations A, B, C, and D are possible, $\rho_A$, $\rho_B$, $\rho_C$, and $\rho_D$ are determined, and the BS signals power parameters $P_A$, $P_B$, $P_C$, and $P_D$ to the UE.

Table 3 above is for exemplary purposes only, and it is assumed that a control channel and an RS are arranged as shown in the subframe of FIG. 5. For example, it is assumed that the PCFICH is allocated only to a $1^{st}$ OFDM symbol, and the PHICH is allocated to any one of $1^{st}$ to $3^{rd}$ OFDM symbols. However, the combinations of Table 3 above may vary depending on the arrangement of the control channel and the RS.

Transmit power can be determined differently between control channels. For example, the PCFICH uses power boosting, whereas the PHICH does not use power boosting. In this case, only a power-boosted control channel can be considered in the determining of transmit power. The UE determines transmit power according to the presence/absence of the PCFICH without the presence/absence of the PHICH.

Meanwhile, the following methods can be considered to reduce an overload caused by signaling of the power parameters $P_A$, $P_B$, $P_C$, $P_D$, $P_E$, and $P_F$.

First, $\rho_A$ and $\rho_B$ used in the existing 3GPP LTE and $\rho_K$ which is a ratio of 'control signal K EPRE to RS EPRE' of a control channel capable of power boosting. For example, a ratio of PCFICH EPRE to RS EPRE can be denoted by $\rho_{PCFICH}$, and a ratio of PHICH EPRE to RS EPRE can be denoted by $\rho_{PHICH}$.

The UE can calculate a ratio of PDSCH EPRE to RS EPRE in each OFDM symbol in which an RS, a control channel, and a PDSCH are combined on the basis of the ratio of the control channel EPRE.

$\rho_A$ can be regarded as a power ratio of EPRE of REs other than an RS to RS EPRE in an 'OFDM symbol in which the RS does not exist'. $\rho_B$ can be regarded as a power ratio of EPRE of REs other than an RS to RS EPRE in an 'OFDM symbol in which the RS exists.'

Assume that, in the OFDM symbol in which the RS exists, a ratio of the number of UEs used in the PDSCH to the number of REs used as an RS in a band in which the UE is subjected to scheduling is denoted by $N_B$, and a ratio of the number of REs used in a control channel K to the number of REs used as an RS is denoted by $M_K$. Then, the UE can obtain $N_B$ and $M_K$ from a subframe structure. The UE can obtain a ratio of PDSCH EPRE to RS EPRE according to the presence/absence of the RS and the presence/absence of the control channel K on the basis of $\rho_A$, $\rho_B$, $\rho_K$, $N_B$, and $M_K$.

In order to determine transmit power of the control channel, the following requirements are given. In an OFDM symbol in which the control channel exists and an RS does not exist, relative transmit power at a frequency band scheduled to the UE is the same as 'transmit power of a case where only the PDSCH exists (i.e. the combination A of Table 3)'. In an OFDM symbol in which the control channel and the RS exist, relative transmit power at a frequency band scheduled to the UE is the same as 'transmit power of a case where the RS and the PDSCH coexist (the combination B of Table 3). That is, PDSCH EPRE is determined so as to maintain transmit power of a region other than the RS.

Figure 7:
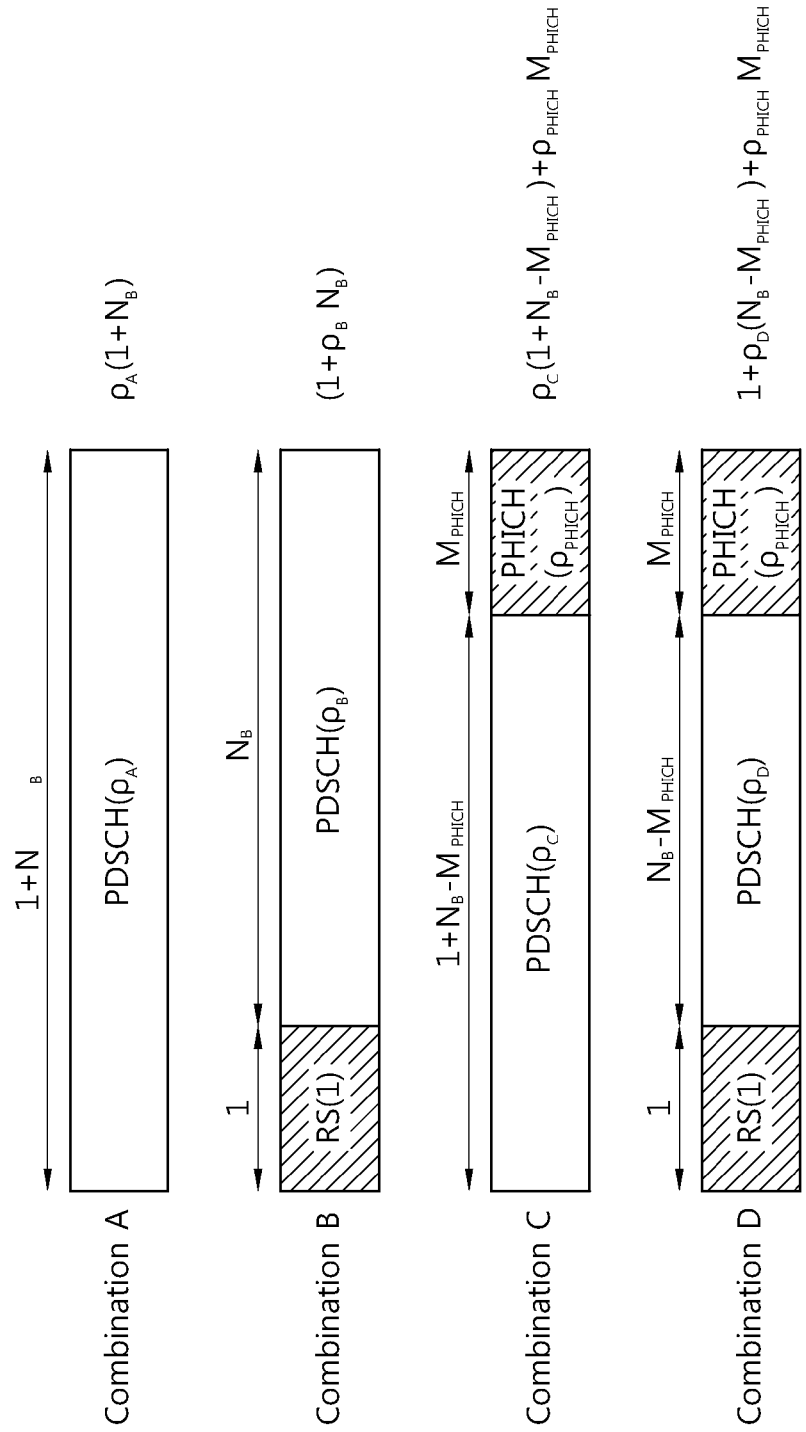
FIG. 7 shows an example of determining transmit power.

FIG. 7 shows an example of determining transmit power. A control channel to be power-boosted considers only a PHICH, but this is for exemplary purposes only. Thus, it will be apparent that those skilled in the art can easily apply the present invention to a case where the PCFICH alone or both the PCFICH and the PHICH are power-boosted.

The combination A relates to the OFDM symbol in which both of the RS and the control channel do not exist. Relative transmit power at a band scheduled to the UE is as follows.

$$\rho_A(1+N_B) \qquad \text{[Equation 1]}$$

The combination B relates to an OFDM symbol in which only the RS exists. Relative transmit power at a band scheduled to the UE is as follows.

$$(1+\rho_B N_B) \qquad \text{[Equation 2]}$$

The combination C relates to an OFDM symbol in which the PHICH exists. A ratio $\rho_C$ of PDSCH EPRE to RS EPRE can be obtained by the following equation.

$$\rho_C(1+N_B-M_{PHICH})+\rho_{PHICH}M_{PHICH}=\rho_A(1+N_B) \qquad \text{[Equation 3]}$$

Herein, $M_{PHICH}$ denotes a ratio of the number of REs used in the PHICH to the number of REs used as the RS.

The left term of Equation 3 above denotes relative transmit power in a case where the PDSCH and the PHICH coexist, and the right term thereof denotes relative transmit power in a case where only the PDSCH exists (combination A).

Therefore, according to Equation 3 above, in the OFDM symbol in which the PHICH and the PDSCH exist, the ratio $\rho_C$ of PDSCH EPRE to RS EPRE can be obtained as follows.

$$\rho_C = \frac{\rho_A(1+N_B) - \rho_{PHICH}M_{PHICH}}{1+N_B - M_{PHICH}} \quad \text{[Equation 4]}$$

The combination D relates to an OFDM symbol in which the RS and the PHICH exist. A ratio $\rho_D$ of PDSCH EPRE to RS EPRE can be obtained as follows.

$$1+\rho_D(N_B-M_{PHICH})+\rho_{PHICH}M_{PHICH}=(1+\rho_B N_B) \quad \text{[Equation 5]}$$

The left term of Equation 5 above denotes relative transmit power in a case where the RS, the PHICH, and the PDSCH coexist, and the right term thereof denotes relative transmit power of a case where only the RS and the PDSCH coexist (combination B).

Therefore, according to Equation 5 above, in the OFDM symbol in which the RS, the PHICH, and the PDSCH exist, the ratio $\rho_D$ of PDSCH EPRE to RS EPRE can be obtained as follows.

$$\rho_D = \frac{\rho_B N_B - \rho_{PHICH}M_{PHICH}}{N_B - M_{PHICH}} \quad \text{[Equation 6]}$$

Accordingly, when the BS report to the UE about information on the ratio $\rho_K$ (e.g., $\rho_{PHICH}$ or $\rho_{PCFICH}$) of control channel K EPRE to RS EPRE, the UE can obtain transmit power used in PDSCH transmission.

Figure 8:
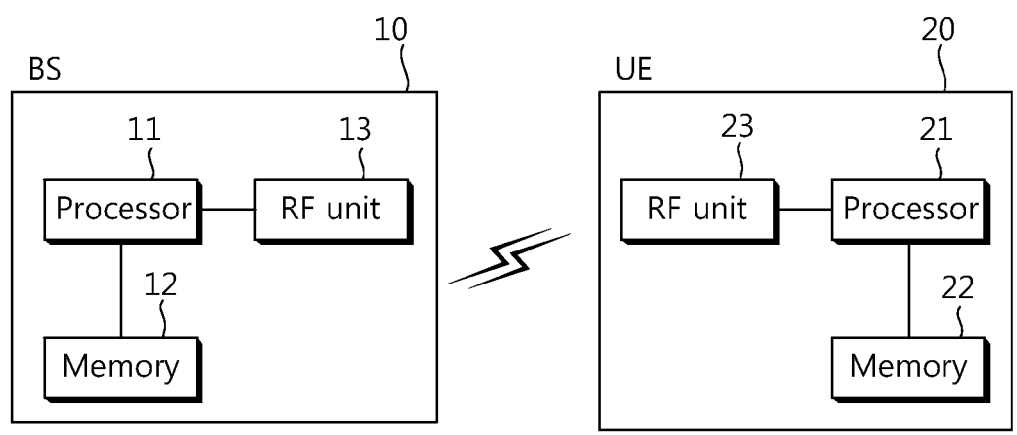
FIG. 8 is a block diagram showing a wireless communication system according to an embodiment of the present invention.

FIG. 8 is a block diagram showing a wireless communication system according to an embodiment of the present invention.

A BS 10 includes a processor 11, a memory 12, and an RF unit 13. The memory 12 is coupled to the processor 11, and stores a variety of information for driving the processor 11. The RF unit 13 is coupled to the processor 11, and transmits and/or receives a radio signal.

The processor 11 implements the operation of the BS in the embodiment of FIG. 6. The processor 11 controls transmit power of a downlink channel, and transmits the downlink channel.

A UE 20 includes a processor 21, a memory 22, and an RF unit 23. The memory 22 is coupled to the processor 21, and stores a variety of information for driving the processor 21. The RF unit 23 is coupled to the processor 21, and transmits and/or receives a radio signal.

The processor 21 implements the operation of the UE in the embodiment of FIG. 6. The processor 21 determines transmit power of a downlink channel in an OFDM symbol in a subframe of each CC on the basis of a power parameter. The processor 21 receives the downlink channel by using the determined transmit power of the downlink channel.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method of receiving downlink data in a multi-carrier system, performed by a user equipment, the method comprising:
receiving a downlink grant on a first physical downlink control channel (PDCCH) via a first component carrier from a base station, wherein the downlink grant includes a carrier index indicating a second component carrier in which a second PDCCH is not transmitted;
determining how an amount of power a physical downlink shared channel (PDSCH) is transmitted via the second component carrier from the base station, based on whether a control channel exists in orthogonal frequency division multiplexing (OFDM) symbols of a subframe of the second component carrier indicated by the carrier index, wherein the control channel includes a physical control format indicator channel (PCFICH) and a physical hybrid automatic repeat request (HARQ) indicator channel (PHICH); and
receiving the downlink data on the PDSCH indicated by the downlink grant via the second component carrier on the basis of the determined amount of power,
wherein the PDSCH on the second component carrier is received in all OFDM symbols including $4^{th}$ later OFDM symbols, except for $1^{st}$ OFDM symbols of the subframe on which at least one or more of the PCFICH and the PHICH are received, and
wherein transmit power of the PCFICH and the PHICH on the second component carrier is higher than the determined amount of power.

2. The method of claim 1, wherein the downlink grant further includes a resource allocation for the PDSCH.

3. The method of claim 1, further comprising:
receiving from the base station a power parameter used to determine the amount of power the PDSCH is transmitted via the second component carrier from the base station.

4. The method of claim 1, wherein the OFDM symbols have equal transmit power in total in the subframe.

5. The method of claim 1, wherein the downlink data is modulated by using 16 quadrature amplitude modulation (QAM) or 64 QAM.

6. The method of claim 1, wherein the amount of power the PDSCH is transmitted via the second component carrier from the base station is determined based on a reference signal in the OFDM symbols.

7. A user equipment for receiving downlink data in a multi-carrier system, the user equipment comprising:
a radio frequency (RF) unit for transmitting and receiving a radio signal; and a processor coupled to the RF unit and configured to:
receive a downlink grant on a first physical downlink control channel (PDCCH) via a first component carrier from a base station, wherein the downlink grant includes a carrier index indicating a second component carrier in which a second PDCCH is not transmitted;
determine how an amount of power a physical downlink shared channel (PDSCH) is transmitted via the second component carrier from the base station, based on whether a control channel exists in orthogonal frequency division multiplexing (OFDM) symbols of a subframe of the second component carrier indicated by the carrier index, wherein the control channel includes a physical control format indicator channel (PCFICH) and a physical hybrid automatic repeat request (HARQ) indicator channel (PHICH); and
receive the downlink data on the PDSCH indicated by the downlink grant via the second component carrier on the basis of the determined amount of power,
wherein the PDSCH on the second component carrier is received in all OFDM symbols including $4^{th}$ later OFDM symbols, except for $1^{st}$ OFDM symbols of the subframe on which at least one or more of the PCFICH and the PHICH are received, and
wherein transmit power of the PCFICH and the PHICH on the second component carrier is higher than the determined amount of power.

8. The user equipment of claim 7, wherein the processor is further configured to receive from the base station a power parameter used to determine the amount of power the PDSCH is transmitted via the second component carrier from the base station.

9. The user equipment of claim 7, wherein the processor is further configured to determine the amount of power the PDSCH is transmitted via the second component carrier from the base station based on a reference signal in the OFDM symbols.

10. The user equipment of claim 7, wherein the downlink grant further includes a resource allocation for the PDSCH.

11. The user equipment of claim 7, wherein the OFDM symbols have equal transmit power in total in the subframe.

12. The user equipment of claim 7, wherein the downlink data is modulated by using 16 quadrature amplitude modulation (QAM) or 64 QAM.

* * * * *